(12) United States Patent
Iwasaki et al.

(10) Patent No.: US 11,067,755 B2
(45) Date of Patent: Jul. 20, 2021

(54) OPTICAL FIBER MODULE AND METHOD FOR MANUFACTURING THE SAME

(71) Applicants: KOHOKU KOGYO CO., LTD., Nagahama (JP); NATIONAL INSTITUTE OF ADVANCED INDUSTRIAL SCIENCE AND TECHNOLOGY, Tokyo (JP)

(72) Inventors: Katsuhiro Iwasaki, Nagahama (JP); Jun Yamamoto, Nagahama (JP); Takashi Kato, Nagahama (JP); Youichi Sakakibara, Tsukuba (JP); Yuki Atsumi, Tsukuba (JP); Tomoya Yoshida, Tsukuba (JP)

(73) Assignees: KOHOKU KOGYO CO., LTD., Nagahama (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 16/978,063

(22) PCT Filed: Mar. 5, 2019

(86) PCT No.: PCT/JP2019/008628
§ 371 (c)(1),
(2) Date: Sep. 3, 2020

(87) PCT Pub. No.: WO2019/172254
PCT Pub. Date: Sep. 12, 2019

(65) Prior Publication Data
US 2021/0018693 A1    Jan. 21, 2021

(30) Foreign Application Priority Data
Mar. 8, 2018 (JP) .............................. JP2018-042364

(51) Int. Cl.
*G02B 6/00* (2006.01)
*G02B 6/36* (2006.01)
(Continued)

(52) U.S. Cl.
CPC ............ *G02B 6/3612* (2013.01); *G02B 6/125* (2013.01); *G02B 6/30* (2013.01)

(58) Field of Classification Search
CPC ......... G02B 6/3612; G02B 6/30; G02B 6/125
See application file for complete search history.

(56) References Cited

U.S. PATENT DOCUMENTS 6,626,585 B1 *   9/2003  Malone .................. G02B 6/423
                                                                  385/88
6,907,151 B2 *   6/2005  Yunus .................. G02B 6/4214
                                                                  385/14
(Continued)

FOREIGN PATENT DOCUMENTS

JP    2013178333 A    9/2013
JP    2016001286 A    1/2016
JP    2018017927 A    2/2018

OTHER PUBLICATIONS

International Search Report (PCT/ISA/210) dated May 7, 2019, by the Japanese Patent Office as the International Searching Authority for International Application No. PCT/JP2019/008628.
(Continued)

*Primary Examiner* — Ellen E Kim
(74) *Attorney, Agent, or Firm* — Buchanan Ingersoll & Rooney PC

(57) ABSTRACT

Provided is an optical module comprising a substrate, a holder, and a spacer. An optical waveguide is formed in/on the substrate and end parts thereof are protruding from one surface of the substrate. The holder holds an optical fiber and exposes one end part of the optical fiber in such a manner that the one end part of the optical fiber can be optically
(Continued)

connected to the end parts of the optical waveguide at a side of one surface of the holder. The spacer is held the one surface of the substrate and the one surface of the holder.

20 Claims, 13 Drawing Sheets

(51) Int. Cl.
*G02B 6/30* (2006.01)
*G02B 6/125* (2006.01)

(56) References Cited

U.S. PATENT DOCUMENTS

| | | | |
|---|---|---|---|
| 7,178,994 B2* | 2/2007 | Tourne | G02B 6/3825 |
| | | | 385/89 |
| 7,527,435 B2* | 5/2009 | Dean, Jr. | G02B 6/3829 |
| | | | 385/78 |
| 8,265,432 B2* | 9/2012 | Doany | G02B 6/4201 |
| | | | 385/14 |
| 8,708,576 B2* | 4/2014 | Shacklette | G02B 6/43 |
| | | | 385/88 |
| 9,551,844 B2* | 1/2017 | Tan | G02B 6/42 |
| 9,759,881 B2* | 9/2017 | Stevens | G02B 6/4292 |
| 10,234,644 B1* | 3/2019 | Butler | G02B 6/125 |
| 2006/0045418 A1* | 3/2006 | Cho | H05K 1/0274 |
| | | | 385/31 |
| 2009/0162006 A1* | 6/2009 | Yamanouchi | G02B 6/43 |
| | | | 385/14 |
| 2011/0069464 A1* | 3/2011 | Joe | G02B 6/4214 |
| | | | 361/783 |
| 2017/0351024 A1* | 12/2017 | Hayakawa | G02B 6/12 |
| 2018/0031786 A1 | 2/2018 | Aoki et al. | |

OTHER PUBLICATIONS

Written Opinion (PCT/ISA/237) dated May 7, 2019, by the Japanese Patent Office as the International Searching Authority for International Application No. PCT/JP2019/008628.

Yoshida, T. et al., "Vertical silicon waveguide coupler bent by ion implantation", Optics Express, Nov. 3, 2015, vol. 23, No. 23, pp. 29449-29456.

* cited by examiner

OPTICAL FIBER MODULE AND METHOD FOR MANUFACTURING THE SAME

TECHNICAL FIELD

The present invention relates to an optical fiber module and method for manufacturing the same.

BACKGROUND ART

Active research and development of an optical circuit has been conducted in recent years, the optical circuit comprising a silicon fine-wire optical waveguide where a silicon material is used for a core part thereof and a quartz-based material is used for a clad part thereof. The silicon fine-wire optical waveguide has a large specific refractive index difference and radiation loss thereof is small even when a curvature radius of the optical waveguide is made small, which makes it possible to downsize the optical circuit.

Besides, the technology mentioned above can be shared with manufacturing process of silicon CMOS LSI and it is expected to reduce manufacturing cost by mass-production based on known technology.

In general, optical input and output between a substrate including the silicon fine-wire optical waveguide as a main component and other optical devices such as an optical fiber, an optical source, an optical receiver and the like are conducted via a cross section of the optical waveguide from a direction parallel to a forming surface of the substrate where the optical circuit is formed.

However, if the optical fiber can be connected from a direction different from the aforementioned direction, especially, from a direction perpendicular to the forming surface of the optical circuit, examination of a silicon fine-wire optical waveguide device at a wafer manufacturing process can be realized. Besides, there are a plenty of technical advantages in that, for example, the optical source and the optical receiver can be mounted from a direction perpendicular to the forming surface of the optical circuit.

As one method for coupling light with the optical circuit along a direction crossing the forming surface of the optical circuit, the optical circuit including the silicon fine-wire optical waveguide as a main component, a following patent document 1 discloses a technique to curve an end part and an adjacent part thereto of the silicon fine-wire optical waveguide in a direction departing from a surface of an optical circuit substrate.

CITATION LIST

Patent Document

Patent Document 1
Japanese Patent Application Laid-Open (kokai) No. 2013-178333

SUMMARY OF THE INVENTION

Technical Problem

Concerning a substrate including the silicon fine-wire optical waveguide mentioned above, when optically aligning the end part of the silicon fine-wire optical waveguide protruding from one surface of the substrate and an end part of the optical fiber held by a holder, and fixing the holder to the substrate, there may be a case where the end part of the silicon fine-wire optical waveguide makes contact with one surface of the holder, causing the end part of the silicon fine-wire optical waveguide to be damaged.

Besides, if a distance between them is made too large in order to avoid the end part of the silicon fine-wire optical waveguide from being damaged, another problem arises that optical coupling efficiency between the silicon fine-wire optical waveguide and the optical fiber is reduced.

An object of the present invention is, concerning an optical module optically connecting an end part of a linear optical waveguide protruding from one surface of a substrate in/on which an optical circuit is formed and an end part of an optical fiber held by a holder, to maintain a distance between the one surface of the substrate and the one surface of the holder with high accuracy as well as with ease without damaging the end part of the optical waveguide.

Solution to Problem

According to one aspect of the present invention,
an optical fiber module comprising:
an optical circuit formed body including a first surface, where an optical waveguide is formed and an end part of the optical waveguide is protruding from the first surface;
a holder including a second surface facing with the first surface, which holds an optical fiber and exposes one end part of the optical fiber in such a manner that the one end part of the optical fiber can be optically connected to the end part of the optical waveguide at a side of the second surface; and
a spacer held between the first surface and the second surface
is provided.

The first surface of the optical circuit formed body and the second surface of the holder are supported by the spacer with a predetermined space therebetween, and therefore it can be suppressed that the second surface of the holder damages the one end part of the optical waveguide.

It is preferable that a diameter or a height of the spacer along a normal direction of the first surface is substantially same as or larger than a protruding length of the end part of the optical waveguide from the first surface along the normal direction.

When making the optical circuit formed body and the holder approach with each other, a distance between the first surface of the optical circuit formed body and the second surface of the holder comes to remain unchanged at a timing when a space between the first surface of the optical circuit formed body and the second surface of the holder becomes equal to the diameter or the height of the spacer. That is, the space between the first surface of the optical circuit formed body and the second surface of the holder does not become smaller than the diameter or the height of the spacer along the normal direction of the first surface, and thus it can be suppressed that the end part of the optical waveguide is damaged.

The spacer can be made to be included in, for example, an adhesive agent for adhering the first surface and the second surface to each other.

It is preferable that the optical circuit formed body and the holder are formed so as to transmit light of a specific wavelength.

As one example, the holder can be made of quartz or borosilicate glass.

The optical circuit formed body and the holder are made to transmit the light of the specific wavelength, and thereby the spacer can be observed with light emitted from an opposite side surface of the second surface of the holder or from an opposite side surface of the first surface of the optical circuit formed body.

It is preferable that the adhesive agent is provided in such a manner that the adhesive agent is not interposed between the end part of the optical waveguide and the one end part of the optical fiber.

With this, the adhesive agent comes into contact with a region excluding the end part of the optical fiber out of the second surface of the holder, and therefore it becomes possible to maintain the space between the second surface of the holder and the first surface of the optical circuit formed body at a distance more than or equal to the diameter or the height of the spacer without the spacer obstructing progress of the light.

It is preferable that the optical fiber module comprises a reinforcing part for reinforcing holding force of the optical fiber at an opposite side surface of the second surface of the holder, the reinforcing part being provided in a space formed around the optical fiber in the holder.

It is preferable that reinforcing part is made of a reinforcing material fixed to a recessed part formed on the opposite side surface.

Besides, it is preferable that the reinforcing part is provided in a region which does not obstruct progress of light of a specific wavelength progressing in a normal direction of the first surface and transmitting through the optical circuit formed body and the holder. In this case, it becomes easier to observe the spacer irradiated with the light of the specific wavelength.

A gap may be created between a tip of the end part of the optical waveguide and a tip of the one end part of the optical fiber.

It is preferable that the one end part of the optical fiber is arranged on an optical axis of light emitted from the end part of the optical waveguide.

According to another aspect of the present invention, a method for manufacturing an optical fiber module, the optical fiber module comprising an optical circuit formed body including a first surface, where an optical waveguide is formed and an end part of the optical waveguide is protruding from the first surface, and a holder including a second surface facing with the first surface, which holds an optical fiber and exposes one end part of the optical fiber in such a manner that the one end part of the optical fiber can be optically connected to the end part of the optical waveguide at a side of the second surface, comprising:

preparing a spacer and an adhesive agent for supporting the first surface and the second surface with a predetermined space therebetween in a normal direction of the first surface;

interposing the adhesive agent including the spacer between the first surface and the second surface;

relatively moving the optical circuit formed body and the holder with respect to each other in such a manner that the first surface and the second surface approach with each other to have the first surface and the second surface hold the spacer therebetween; and curing the adhesive agent and thereby fixing the optical circuit formed body and the holder to each other is provided.

It is preferable to, when relatively moving the optical circuit formed body and the holder with respect to each other in such a manner that the first surface and the second surface approach with each other, irradiate the adhesive agent with light of a specific wavelength transmitting through the holder and the optical circuit formed body, and thereby observe the spacer.

In this case, the holder may be relatively moved along the first surface under a state where the spacer is being held between the first surface and the second surface, and thereby alignment between the optical waveguide and the optical fiber can be conducted.

It is preferable that the adhesive agent is a UV curable adhesive agent, and the adhesive agent is cured by irradiating the adhesive agent with UV light.

Effects of the Invention

According to the present invention, concerning an optical module optically connecting an end part of an optical waveguide protruding from a first surface of an optical circuit formed body and an end part of an optical fiber held by a holder, it becomes possible to maintain a distance between the first surface of the optical circuit formed body and the second surface of the holder with high accuracy as well as with ease without damaging the end part of the optical waveguide.

BRIEF DESCRIPTION OF THE DRAWINGS

FIG. 10b is a diagram showing a state where the adhesive agent applied on the holder comes into contact with the substrate, concerning the connection structure shown in FIG. 10a.

DESCRIPTION OF THE EMBODIMENTS

In the present embodiment, a description is made on an example where a protruding length of an end part of a silicon fine-wire optical waveguide, the end part protruding from one surface of a substrate along a normal direction thereof is substantially same as a diameter of each of spacers. However, what is actually important is that a space between the one surface of the substrate and one surface of a holder is more than or equal to the diameter of each of the spacers, and therefore this space does not necessarily completely match with the diameter of each of the spacers but it is enough that each of the spacers has a diameter substantially same as or larger than the protruding length. It should be noted that when a spacer has a shape other than a spherical shape, it is enough that this spacer has a height (a height along the normal direction of the one surface of the substrate) substantially same as or larger than the protruding length.

An optical fiber module and a method for manufacturing the same according to each embodiment of the present invention will be described in detail below, referring to figures.

First Embodiment

Figure 1A:
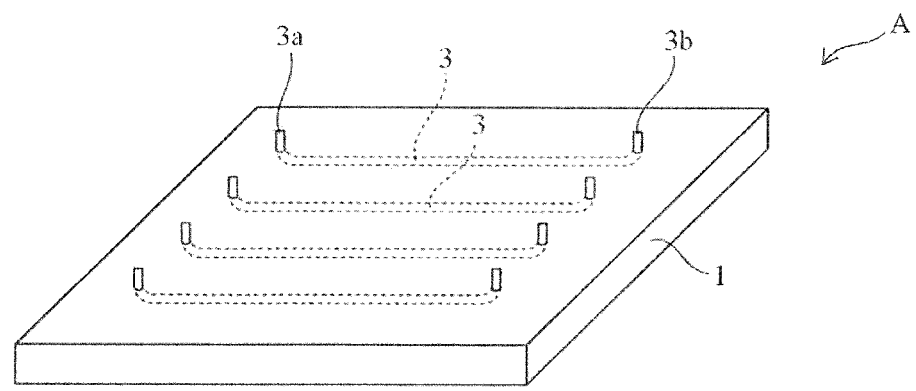
FIG. 1a is a perspective diagram showing one configuration example of a silicon substrate in/on which silicon fine-wire optical waveguides are formed, concerning an optical fiber module according to a first embodiment of the present invention.
Figure 1B:
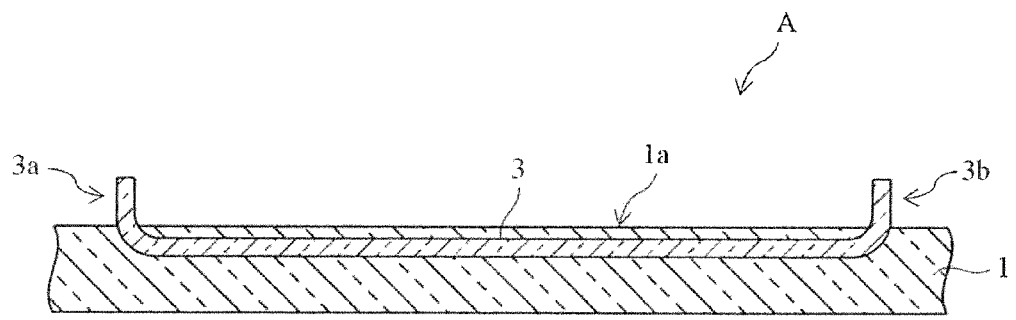
FIG. 1b is a sectional view where this silicon substrate is cut along an extending direction of the silicon fine-wire optical waveguides.
Figure 2A:
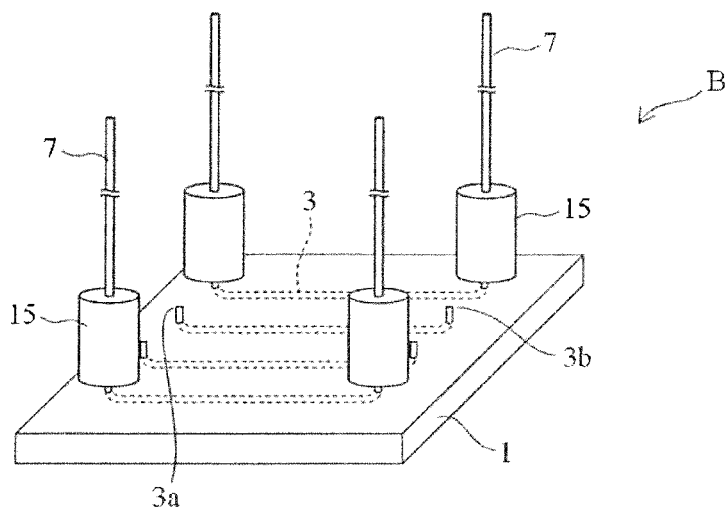
FIG. 2a is a perspective diagram showing one configuration example of an optical module according the present embodiment.
Figure 2B:
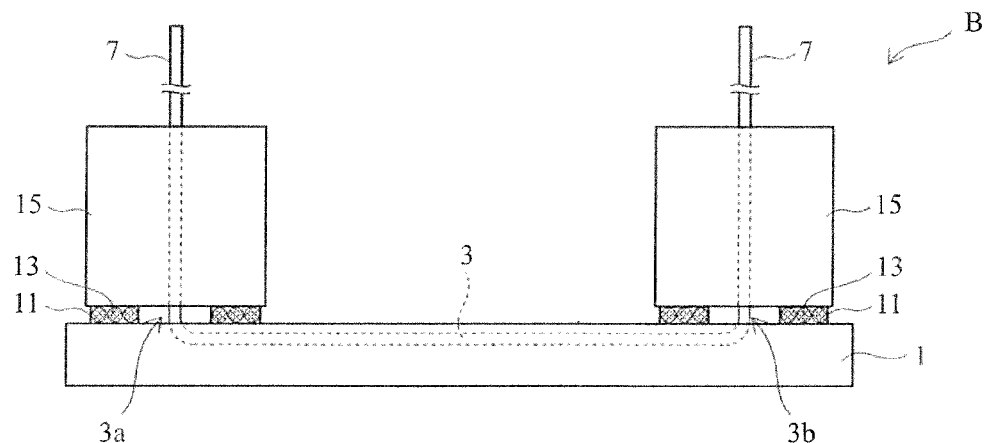
FIG. 2b is a side-view of this optical module.
Figure 2C:
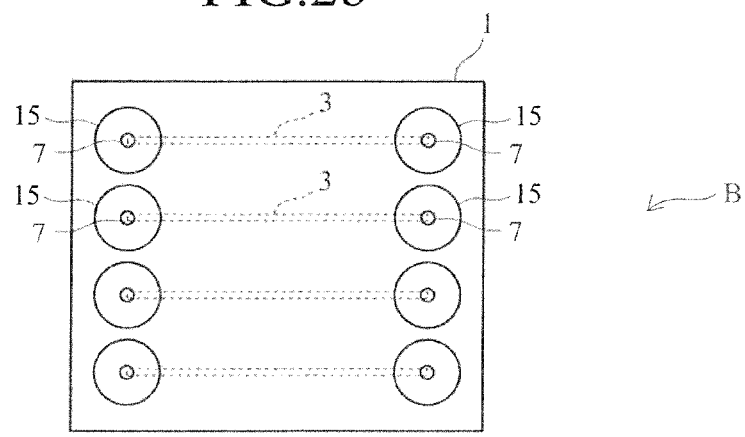
FIG. 2c is a plan view of this optical module.

An optical fiber module according to a first embodiment of the present invention includes a silicon fine-wire optical waveguide structure A shown in FIG. 1a and FIG. 1b and an optical module B shown in FIG. 2a to FIG. 2c.

FIG. 1a is a perspective diagram of the silicon fine-wire optical waveguide structure A. The silicon fine-wire optical waveguide structure A comprises, for example, a substrate 1 in/on which a non-illustrated optical circuit is formed and a plurality of silicon fine-wire optical waveguides 3, 3, . . . formed along one surface of the substrate 1. FIG. 1b is a sectional view where the substrate 1 and the silicon fine-wire optical waveguides 3, 3 in FIG. 1a are cut along an extending direction of the silicon fine-wire optical waveguides 3, 3, . . . . It should be noted that the substrate 1 corresponds to an "optical circuit formed body" of the present invention and one surface 1a of the substrate 1 corresponds to a "first surface" of the present invention. Besides, each of the silicon fine-wire optical waveguides 3, 3 corresponds to an "optical waveguide" of the present invention.

A cross-sectional shape of each of the silicon fine-wire optical waveguides 3 may be rectangular. For example, the cross-sectional shape thereof may have one side with a length of 0.4 µm and another side crossing the one side with a length of 0.2 µm. Besides, a number of the silicon fine-wire optical waveguides 3 may be one.

End parts 3a, 3b of each of the silicon fine-wire optical waveguides 3 are protruding from the one surface 1a of the substrate 1 so as to depart upward. For example, a structure shown in the patent document 1 where the end parts 3a, 3b are curved from one surface of a substrate and are protruding so as to depart from the one surface of the substrate may be used as the silicon fine-wire optical waveguide structure A.

Here, an example where silicon is used as a material of the silicon fine-wire optical waveguides 3 is shown. However, a fine-wire made of SiGe, amorphous silicon, and the like may be used.

Alternatively, a structure described in a following literature by the inventors may be used.

Y. Atsumi, T. Yoshida, E. Omoda, and Y. Sakakibara, "Design of compact surface optical coupler based on vertically curved silicon waveguide for high-numerical aperture single-mode optical fiber," Jpn. J. Appl. Phys., 56(9), 090307-1-4 (2017).

Especially, when a structure as described in the literature above is used, wherein an end part of a silicon fine-wire optical waveguide protrudes from one surface of a substrate in a normal direction thereof, it becomes possible to arrange one end part of an optical fiber on an optical axis of light emitted from the end part of the silicon fine-wire optical waveguide, and therefore a good optical connection with low optical loss between the silicon fine-wire optical waveguide and the optical fiber can be realized.

In order to form the silicon fine-wire optical waveguides 3 in the substrate 1, a special SOI substrate may be used. For example, it is preferable to use an SOI substrate where a thick oxide film (BOX layer) with a thickness ranging approximately from 2 µm to 3 µm is formed on a silicon substrate, and a silicon device layer with a thickness of approximately 200 nm is formed on this oxide film. In the present embodiment, such a structure is called a substrate. However, a structure of a substrate is not limited thereto.

It should be noted that a diameter of each of the silicon fine-wire optical waveguides 3 and a thickness of an insulating film are extremely small compared to a diameter of a spacer mentioned later, and thus when providing (arranging) a holder mentioned later on the substrate 1, it can be regarded that the holder is provided (arranged) on the substantially flat one surface 1a of the substrate 1.

A protruding length of each of the end parts 3a, 3b of each of the silicon fine-wire optical waveguides 3 in the normal direction of the one surface 1a of the substrate 1 will be referred to as Lt. The protruding length Lt in the present specification includes not only a protruding length from the one surface 1a of the substrate 1 but also, if an insulating film etc. is formed on the one surface 1a of the substrate 1, a protruding length from a surface of this insulating film etc.

The end parts 3a, 3b of each of the silicon fine-wire optical waveguides 3 are optical input/output parts and can be optically connected to an external optical device by means of, for example, an optical fiber mentioned later.

Although it is not shown in FIG. 1a and FIG. 1b, a quartz layer is formed in this example around a core of each of the silicon fine-wire optical waveguides 3 using a CVD (Chemical Vapor Deposition) method etc. for a purpose of reinforcing each of the silicon fine-wire optical waveguides 3 or matching the diameter of each of the silicon fine-wire optical waveguides 3 with a mode field diameter of each of the optical fibers. The substrate 1 has, for example, a longitudinal length of 20 mm, a lateral length of 20 mm, and a thickness of 0.5 mm. Alternatively, instead of the substrate 1, a substrate including a base substrate, an optical waveguide is formed therein may be used, the base substrate having a shape (a cubic shape, for instance) other than a plate shape. In the present embodiment, the protruding length Lt of each of the end parts 3a, 3b protruding from the one surface 1a of the substrate 1 is 10 μm, for example. These sizes are not limited thereto.

FIG. 2a is a perspective diagram of an optical fiber module including the optical module B according to the present embodiment. FIG. 2b is a side-view of FIG. 2a and FIG. 2c is a plan view of FIG. 2a.

As shown in FIG. 2a and FIG. 2b, as for the optical module B according to the present embodiment, each of the end parts 3a, 3b of each of the silicon fine-wire optical waveguides 3 in the silicon fine-wire optical waveguide structure A shown in FIG. 1a and a corresponding end part of each of the optical fibers 7 extending in a direction crossing the one surface 1a of the substrate 1 are connected.

Here, a term "connect" is not limited to a form where each of the end parts 3a, 3b of each of the silicon fine-wire optical waveguides 3 makes contact with the corresponding end part of each of the optical fibers 7, but any forms can be adopted as long as they are optically connected.

A clad diameter of each of the optical fibers 7 is, for example, approximately φ125 μm or φ180 μm, and thus it is difficult to make each of the optical fibers 7 itself stand on its own on the substrate 1.

Therefore, as shown in FIG. 2a, a cylindrical capillary etc. with a diameter larger than that of the optical fiber 7 can be used as a holder 15, the capillary holding the optical fiber 7 from a surrounding thereof (specifically, holding a specific section of the optical fiber 7). A shape of the holder 15 is not particularly limited. For example, a cross section of the holder 15 may be polygonal shape.

A brief description will be made on a connecting process of each of the end parts 3a, 3b of each of the silicon fine-wire optical waveguides 3 and the corresponding end part of each of the optical fibers 7.

First, insert the optical fiber 7 into a hole penetrating a center of the capillary constituting the holder 15 and fix the optical fiber 7 to the holder 15 with an adhesive agent and the like. Thereafter, flatly polish one surface of the holder 15 and the optical fiber 7 fixed to the holder 15. As a result, one end part (a tip 7a as mentioned later) of the optical fiber 7 becomes exposed. When optically connecting each of the end parts 3a, 3b of each of the silicon fine-wire optical waveguides 3 and the corresponding optical fiber 7, one surface 15a of the corresponding holder 15 can be used as a surface to be supported by the one surface 1a of the substrate 1. The one surface 15a of the holder 15 corresponds to a "second surface" of the present invention.

A material of the holder 15 is not particularly limited. However, it is preferable to use a material transmitting at least one of visible light or near infrared light such as quartz glass (silica glass) or borosilicate glass. In general, zirconia may be also used. However, in the present embodiment, a lamp configured to emit light of an approximate wavelength of, for example, 1 μm is arranged on top of the holder 15 in order to observe with a camera an adhesive agent applied (coated) on the one surface 15a of the holder 15 when conducting optical alignment as mentioned later, and light transmitted through the holder 15 and the substrate 1 is captured and observed with the camera from beneath the substrate 1. Therefore, it is preferable that the holder 15 is made of a material having high transmission in a wavelength range of this emitted light. Besides, when fixing the substrate 1 and the holder 15 to each other with a UV (ultraviolet light) curable adhesive agent, it is preferable that the holder 15 is made of a material having high transmission also in a wavelength range of UV light since the adhesive agent is irradiated with the UV light.

As shown in FIG. 2b, an adhesive agent 11 can be used in order to arrange the holder 15 on the one surface of the substrate 1 and to fix it to the one surface of the substrate 1. The adhesive agent 11 may be applied around a tip 7a (refer to FIG. 4a to FIG. 4b) of the one end part of each of the optical fibers 7, keeping away from a region where the tip 7a is exposed at the one surface of the holder 15.

As shown in FIG. 2c, for example, a structure having many optical input/output parts can be manufactured, wherein each of the optical fibers 7 is optically connected to each of the end parts 3a, 3b of each of a plurality of the silicon fine-wire optical waveguides 3.

Figure 3A:
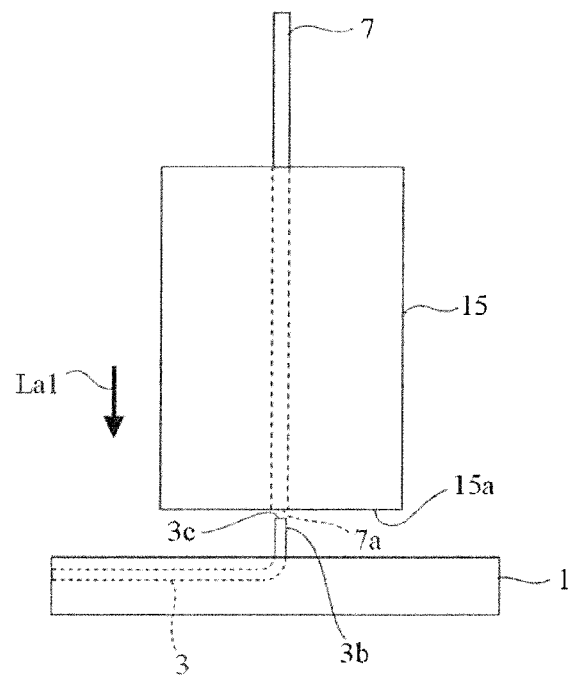
FIG. 3a is a side-view of the substrate and the holder of the optical fiber according to the present embodiment.
Figure 3B:
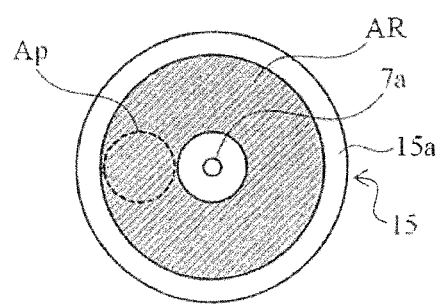
FIG. 3b is a bottom view of this holder.
Figure 5:
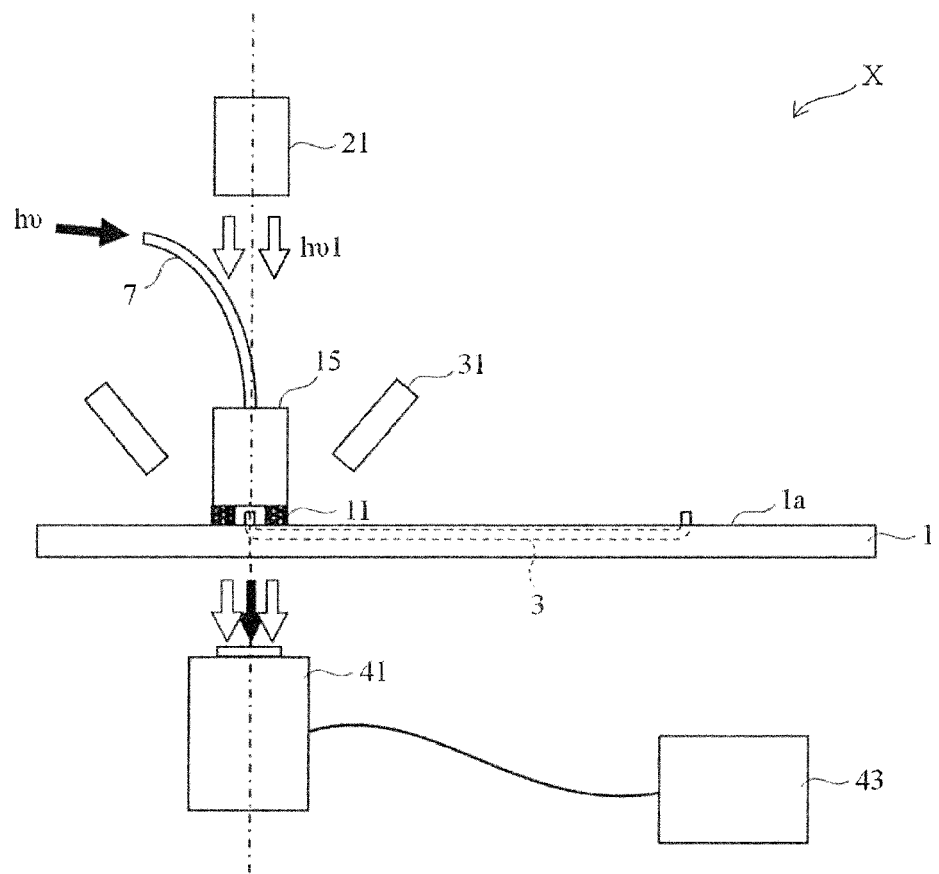
FIG. 5 is a diagram showing an optical system used to assemble the optical fiber module.
Figure 6A:
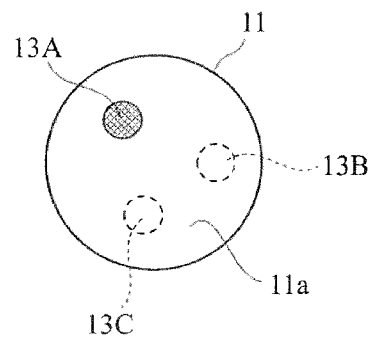
FIG. 6a is a diagram showing a state where the adhesive agent and the spacers are observed when the holder is brought close to the substrate.
Figure 6B:
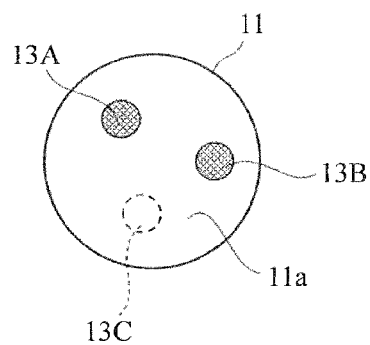
FIG. 6b is a diagram showing a state where the adhesive agent and the spacers are observed when the holder is brought further close to the substrate.
Figure 6C:
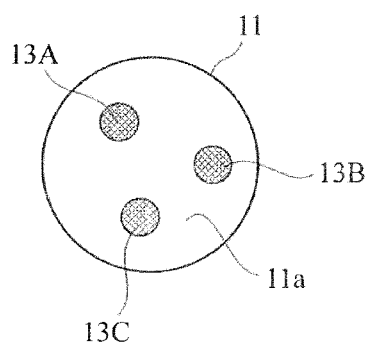
FIG. 6c is a diagram showing a state where the adhesive agent and the spacers are observed when all of the spacers come into contact with the holder and the substrate.

FIG. 3a and FIG. 3b are a side-view of the substrate 1 and the holder 15 of the optical fiber 7 and a bottom view of the holder 15 according to the present embodiment. FIG. 4a to FIG. 4d are diagrams showing a method for assembling the optical fiber module according to the present embodiment. FIG. 5 is a diagram showing an optical system used to assemble the optical fiber module. FIG. 6a to FIG. 6c are diagrams showing states of the adhesive agent 11 and spacers 13 observed from beneath the substrate 1 in accordance with processes in FIG. 4a to FIG. 4d.

In order to increase optical coupling efficiency between each of the silicon fine-wire optical waveguides 3 and each of the optical fibers 7, it is necessary to bring the holder 15 close to the substrate 1 (refer to an arrow La1 in FIG. 3a), thereafter, to move the holder 15 along the one surface 1a of the substrate 1, and thereby to conduct aligning process for bringing a position of each of the optical fibers 7 close to a position of each of the silicon fine-wire optical waveguides 3 in an in-plane direction. At this time, since the end parts 3a, 3b of each of the silicon fine-wire optical waveguides 3 are protruding from the one surface 1a of the substrate 1, there is a possibility that the holder 15 makes contact with the end parts 3a, 3b when aligning, causing the end parts 3a, 3b to be damaged.

Therefore, in the present embodiment, the optical fiber module has been devised as will be described below.

In order to avoid the end parts 3a, 3b of each of the silicon fine-wire optical waveguides 3 from being damaged, prepare the spacers 13 and the adhesive agent 11 (refer to FIG. 4a to FIG. 4d), the spaces 13 being used also for a liquid crystal panel etc. Next, interpose the adhesive agent 11 including the spacers 13 between the one surface 1a of the substrate 1 and the one surface 15a of the holder 15. For example, apply the adhesive agent 11 including the spacers 13 onto the one surface 15a of the holder 15.

As one example, silicon dioxide is used for a material of the spacers 13. In this case, there is an advantage that the spacers 13 are hard to be deformed even when they are pressed.

For example, mix and stir the spacers 13, each of which having a spherical shape with a diameter R of φ10 μm and the UV curable adhesive agent 11 at a weight ratio of 1:9 so as to substantially uniformly distribute the spacers 13 in the adhesive agent 11. It should be noted that the diameter R of each of the spacers 13 is equal to the protruding length Lt of each of the silicon fine-wire optical waveguides 3.

Figure 4A:
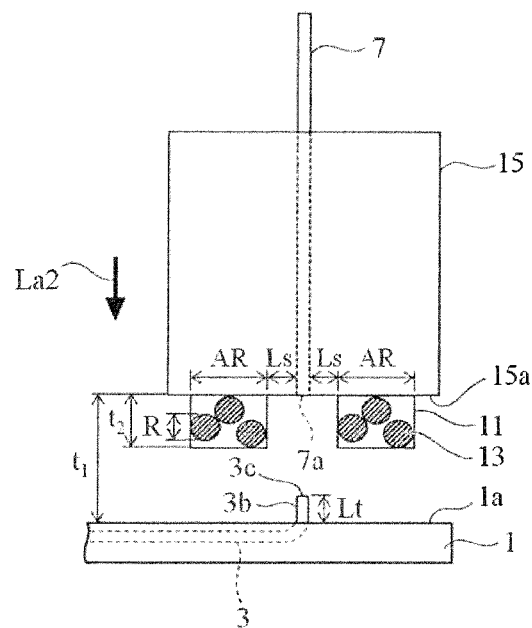
FIG. 4a is a diagram showing a state where the holder, an adhesive agent being applied thereon, is brought close to the substrate.

Subsequently, as shown in FIG. 4a, apply a certain amount of the adhesive agent 11 including the spacers 13 onto the one surface 15a of the holder 15. At this time, the tip 7a of the end part of each of the optical fibers 7 is exposed at a central part of the one surface 15a of the holder 15, and therefore the adhesive agent 11 is annularly applied onto a surrounding region AR (refer to FIG. 3b) of the tip 7a of the end part of each of the optical fibers 7, avoiding a region where the tip 7a is exposed. For example, a space Ls is provided between the optical fiber 7 and the applied region AR of the adhesive agent 11. The spacers 13 are held within the region AR by the adhesive agent 11 and thus would not obstruct progress of light transmitting each of the optical fibers 7.

Further, as shown in FIG. 5, observe with a camera 41 the adhesive agent 11 applied onto the one surface 15a of the holder 15 from beneath the substrate 1.

On top of the holder 15, a lamp 21 is arranged, the lamp 21 capable of irradiating light hv1 in order to facilitate the observation with the camera 41. Besides, curing means for curing the adhesive agent is arranged.

For example, an UV curable adhesive agent is used as the adhesive agent 11, and UV light irradiators 31 are arranged, each of which being arranged at a position where the adhesive agent 11 is irradiated with the UV light. Besides, the camera 41 may comprise an image processing part 43 for image-processing an image captured by the camera 41 so as to make it easier to see a captured image. The image processing part 43 displays on a display device (illustration omitted) an image captured by the camera 41 in a magnified form. The camera 41 is adjusted in such a manner that an object positioned in a vicinity of the one surface 1a of the substrate 1 is focused on.

Next, as shown in FIG. 4a, move the holder 15 from a position above the substrate 1 toward the one surface 1a of the substrate 1 as illustrated with an arrow La2, the position being a position at which t1 is sufficiently larger than t2 where t1 is a distance between the one surface 1a of the substrate 1 and the one surface 15a of the holder 15 and t2 is a thickness of the adhesive agent 11. It should be noted that the substrate 1 may be moved instead of moving the holder 15, or both the holder 15 and the substrate 1 may be moved.

The spaces 13 are disorderly distributed in the adhesive agent 11. That is, at a timing when the adhesive agent 11 is applied onto the one surface 15a of the holder 15, a distance between each of the spacers 13 and the one surface 15a of the holder 15 is different from each other. It should be noted that instead of mixing the spacers 13 in the adhesive agent 11 beforehand, the spacers 13 may be mixed in the adhesive agent 11 after the adhesive agent 11 is applied onto the one surface 1a of the substrate 1 or the one surface 15a of the holder 15. FIG. 6a is an image where the adhesive agent 11 applied onto the one surface 15a of the holder 15 is captured with the camera 41 from beneath the substrate 1. FIG. 6a shows a part of a region (a region Ap in FIG. 3b) with magnification out of the adhesive agent 11 applied onto the holder 15. As the holder 15 approaches the substrate 1 closer, a spacer 13A closest to a substrate 1 side becomes focused on among the spacers 13, and therefore the spacer 13A comes to be observed gradually clearly.

Figure 4B:
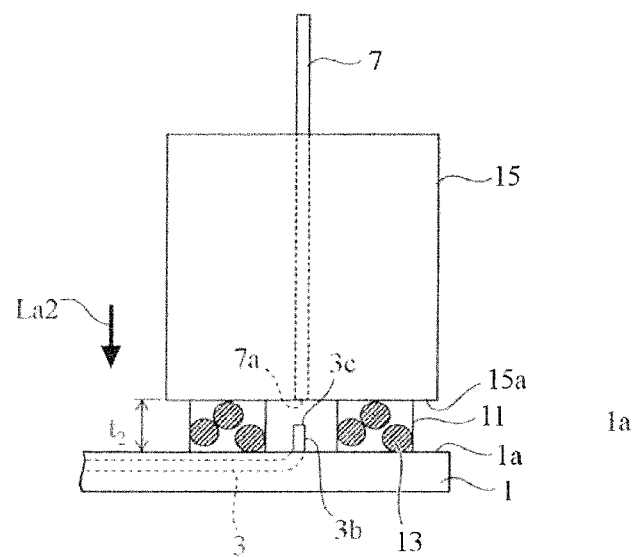
FIG. 4b is a diagram showing a state where the adhesive agent applied on the holder comes into contact with the substrate.

As shown in FIG. 4b, when the one surface 15a of the holder 15 is moved further close to the one surface 1a of the substrate 1, the adhesive agent 11 makes contact with the one surface 1a of the substrate 1 (the distance t1 between the one surface 1a of the substrate 1 and the one surface 15a of the holder 15 becomes equal to the initial thickness t2 of the adhesive agent), and the adhesive agent 11 is pressed and starts to gradually spread in a direction of the one surface 1a.

Subsequently, as shown in FIG. 6b, according to an image observed with the camera 41, a spacer 13B which is second closest to the substrate 1 side next to the spacer 13A becomes focused on, and the spacer 13B starts to be observed clearly.

Figure 4C:
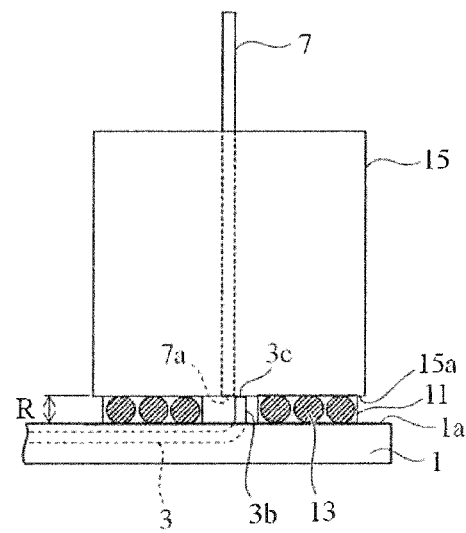
FIG. 4c is a diagram showing a state where all spacers included in the adhesive agent come into contact with the holder and the substrate.

Thereafter, as shown in FIG. 4c, each of the spacers 13 makes contact with the one surface 1a of the substrate 1 and the one surface 15a of the holder 15 (the distance t1 between the one surface 1a of the substrate 1 and the one surface 15a of the holder 15 becomes equal to the diameter R of each of the spacers 13 which is smaller than the initial thickness t2 of the adhesive agent), and it is prevented that the one surface 1a of the substrate 1 and the one surface 15a of the holder 15 approach any closer.

That is, the adhesive agent 11 stops spreading, and the holder 15 comes to stand still under a state where all of the spacers 13 are held (sandwiched) between the one surface 1a of the substrate 1 and the one surface 15a of the holder 15. In other words, the one surface 1a of the substrate 1 and the one surface 15a of the holder 15 are supported by the spacers 13 in the normal direction of the one surface 1a of the substrate 1 with a predetermined space R therebetween. The diameter R of each of the spacers 13 is equal to the protruding length Lt of each of the end parts 3a, 3b of each of the silicon fine-wire optical waveguides 3 from the one surface 1a of the substrate 1, and therefore it becomes possible to bring a tip 3c of each of the silicon fine-wire optical waveguides 3 into contact with the tip 7a of each of the optical fibers 7 without damaging the end parts 3a, 3b. Accordingly, it can be suppressed that the optical coupling efficiency between each of the silicon fine-wire optical waveguides 3 and each of the optical fibers 7 is reduced.

When a state is realized where all of the spacers 13A, 13B, and 13C are held between the substrate 1 and the holder 15, as shown in an image observed with the camera 41, all of the spacers 13A, 13B, and 13C come to be observed clearly and a number of the spacers that can be seen clearly does not increase anymore, enabling to grasp a timing at which the one surface 1a of the substrate 1 and the one surface 15a of the holder 15 do not approach any closer.

Therefore, it becomes possible to stop movement of the holder 15 immediately after the spacers 13 are held between the one surface 1a of the substrate 1 and the one surface 15a of the holder 15. Hence, it can be more surely suppressed that the holder 15 would damage the end parts 3a, 3b.

States in which the holder 15, the adhesive agent 11 being applied thereto approaches the substrate 1 and stops at a position apart from the substrate 1 by the predetermined distance as shown in the processes of FIG. 4a to FIG. 4d can be observed with the camera 41 arranged beneath the substrate 1, using light emitted from above the holder 15 as shown in FIG. 5.

Besides, the adhesive agent 11 has not been cured under these states, and thus alignment can be conducted by moving the holder 15 along the one surface 1a of the substrate 1. In the present embodiment, the alignment means to position the tip 3c of each of the silicon fine-wire optical waveguides 3 and the tip 7a of the optical fibers 7 in such a manner that each of the silicon fine-wire optical waveguides 3 can be optically connected with each of the optical fibers 7. It should be noted that when aligning, the substrate 1 may be moved, or both of the substrate 1 and the holder 15 may be moved.

Each of the spacers 13 has a spherical shape, and thus it functions as a bearing when the holder 15 moves in parallel with the one surface 1a of the substrate 1, realizing smooth movement of the holder 15. It should be noted that similar effects can be also obtained by using spacers, each of which having a cylindrical shape instead of using the spacers 13. That is, the spacers, each of which having the cylindrical shape are arranged in such a manner that outer peripheral surface of each of the spacers with the cylindrical shape makes contact with the one surface 1a of the substrate 1 and the one surface 15a of the holder 15.

Figure 4D:
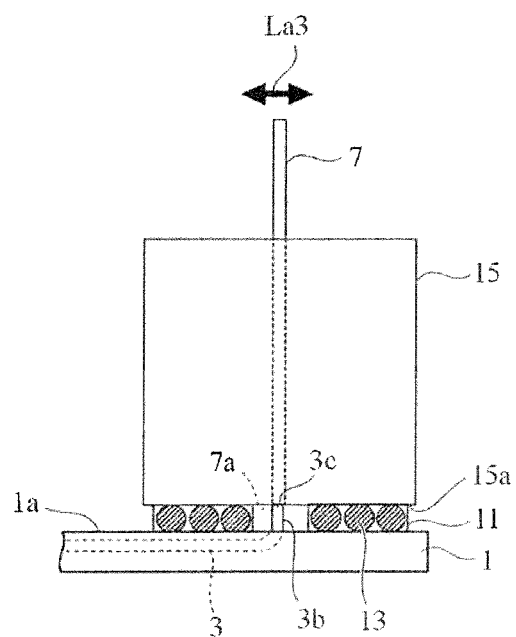
FIG. 4d is a diagram showing a state where the holder is moved along one surface of the substrate and thereby alignment is conducted.

Thereafter, observe with the camera 41 and thereby, as shown in FIG. 4d, the alignment (positioning in a direction of an arrow La3 so that optical connection can be made) can be conducted between the tip 3c of each of the silicon fine-wire optical waveguides 3 and the tip 7a of each of the optical fibers 7.

At a timing of the alignment being completed, cure the adhesive agent 11 with, for example, the UV light from the UV light irradiator 31, and thereby the substrate 1 and the holder 15 can be rapidly fixed, maintaining a distance between the one surface 1a of the substrate 1 and the one surface 15a of the holder 15 as the predetermined distance, for example, the same distance as the diameter R of each of the spacers 13 as well as under a state in which the alignment has been completed.

When forming the substrate 1 using silicon, an LED lamp with a wavelength of, for example, substantially 1 μm can be used in order to transmit light emitted from the lamp 21. When surface reflection at a lower surface side of the substrate 1 is large, it is difficult to observe the adhesive agent applied onto the holder 15 which is located above the substrate 1, and therefore a configuration in FIG. 5 is more preferable. Wavelength of light from the lamp 21 transmitting through the substrate 1 and the holder 15 will be referred to as a "specific wavelength" for convenience sake. The specific wavelength may be different from 1 μm as long as it is included in a wavelength range of the light transmitting through the holder 15 and the substrate 1. In addition, the specific wavelength may be identified not by a single wavelength but also by a wavelength range. For example, if visible light and near infrared light transmit through the holder 15 and the substrate 1, the specific wavelength may be included in a wavelength range of the visible light and the near infrared light.

As described above, according to the present embodiment, when manufacturing an optical fiber module by fixing a substrate in/on which an silicon fine-wire optical waveguide(s) is formed and a holder holding an optical fiber(s) to each other, it becomes possible to accurately maintain a distance between one surface of the substrate and one surface of the holder without damaging an end part(s) of the silicon fine-wire optical waveguide(s) protruding from the one surface of the substrate. Besides, the distance between the one surface of the substrate and the one surface of the holder can be set to a desired value. Further, accurate positioning (alignment) becomes possible between the end part(s) of the silicon fine-wire optical waveguide(s) and an end part(s) of the optical fiber(s) in a direction of the one surface of the substrate.

A modification example of an optical fiber module according to the present embodiment will be described below, focusing on different points from the first embodiment.

First Modification Example

To begin with, a first modification example of the present embodiment will be described.

Figure 7:
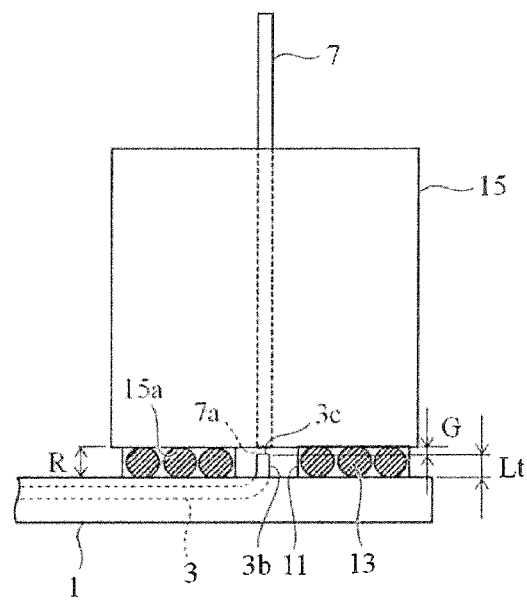
FIG. 7 is a diagram showing another example of a connection structure between each of end parts of each of the silicon fine-wire optical waveguides and an end part of each of the optical fibers according to a first modification example.

FIG. 7 is a diagram showing another example of a connection structure between the tip 3c of each of the end parts 3a, 3b of each of the silicon fine-wire optical waveguides 3 and the tip 7a of each of the optical fibers 7 according to the first modification example. The structure shown in FIG. 7 illustrates an example where a predetermined gap G is created between the tip 3c of each of the silicon fine-wire optical waveguides 3 and the tip 7a of each of the optical fibers 7. Even though the predetermined gap G exists, each of the silicon fine-wire optical waveguides 3 and each of the optical fibers 7 are optically connected.

The predetermined gap G may be provided by modifying the manufacturing method of the first embodiment as follows. For example, a diameter R of each of the spacers 13 may be made larger than the protruding length Lt by the gap G, the length Lt being a length of each of the end parts 3a, 3b of each of the silicon fine-wire optical waveguides 3 from the one surface of the substrate 1. With this, the tip 3c of each of the silicon fine-wire optical waveguides 3 and the tip 7a of each of the optical fibers 7 are not directly connected, and thus it can be suppressed that a connection part between the tip 3c of each of the silicon fine-wire optical waveguides 3 and the tip 7a of each of the optical fibers becomes damaged due to a slight divergence or vibration in manufacturing processes.

Second Modification Example

Next, a second modification example of the present embodiment will be described.

Figure 8A:
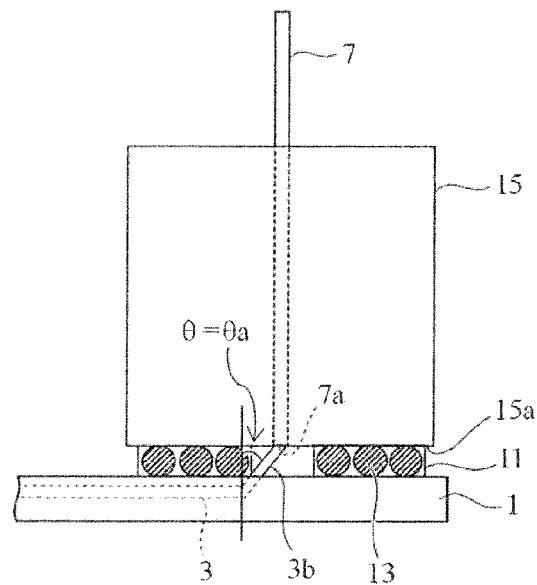
FIG. 8a is a diagram showing another example of a connection structure between each of the end parts of each of the silicon fine-wire optical waveguides and the end part of each of the optical fibers according to a second modification example.
Figure 8B:
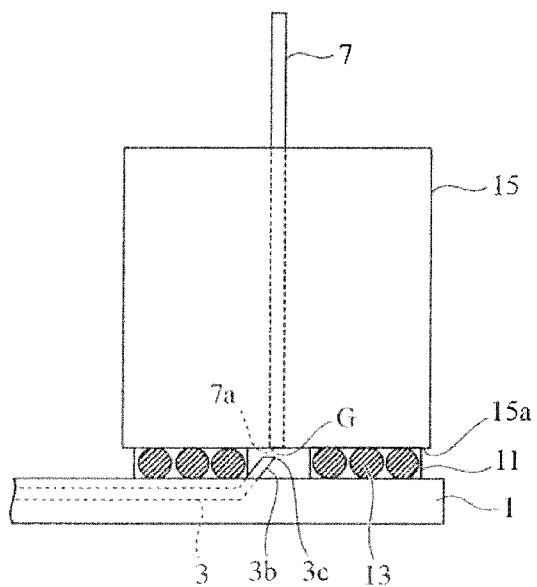
FIG. 8b is a diagram showing an other example of a connection structure having a predetermined gap between each of the end parts of each of the silicon fine-wire optical waveguides and the end part of each of the optical fibers according to the second modification example.

FIG. 8a and FIG. 8b are diagrams showing an other example of a connection structure between each of the end parts 3a, 3b of each of the silicon fine-wire optical waveguides 3 and the end part of each of the optical fibers 7 according to the second modification example. In the structure shown in FIG. 8a, the end parts 3a, 3b of each of the silicon fine-wire optical waveguides 3 are not curved but are bent to linearly extend. Each of the end parts 3a, 3b is connected to each of the optical fibers 7, forming an angle of a predetermined angle θa with respect to a normal of the one surface 15a of the holder 15.

The structure shown in FIG. 8b illustrates an example where a predetermined gap G is created, like the first modification example, between the tip 3c of each of the silicon fine-wire optical waveguides 3 and the tip 7a of each of the optical fibers 7. However, a shape of each of the end parts 3a, 3b of each of the silicon fine-wire optical waveguides 3 is not limited thereto. For example, according to a research by the inventors, it has been revealed that a configuration where a base of each of the end parts 3a, 3b is curved and a standing part is made straight shows a good characteristics.

Second Embodiment

Next, a second embodiment of the present invention will be described.

FIG. 9a to FIG. 9d are side-views of an optical fiber module according to the second embodiment of the present invention. That is, FIG. 9a to FIG. 9d are diagrams, each of which showing a lateral surface of the cylindrical holder 15, the optical fiber 7 is adhered thereto. The holder 15 has, for example, a diameter of φ1.8 mm and a length of 5 mm.

The optical fiber 7 is inserted into an elongated hole 15b provided along a central axis of the holder 15 and is used by polishing a tip thereof. For example, in order to make it easier to insert the optical fiber 7 into the hole 15b of the holder 15, a recessed part 15c with a tapered shape is formed at one end of the hole 15b (at an opposite side of the substrate 1), and a reinforcing material 71 is buried inside and fixed to this recessed part 15c. The reinforcing material 71 may be made of an adhesive agent. A reinforcing part comprised of the reinforcing material 71 reinforces holding force of the optical fiber 7 by the holder 15. This reinforcing part is formed only in a region (that is, in a space formed around a section out of the optical fiber 7 different from a section held by the holder 15) around the optical fiber 7 out of the holder 15, and is not formed at an outer side thereof in a radial direction. Therefore, in a region excluding the reinforcing material 71 out of the holder 15, a region transmitting the light for observing the adhesive agent 11 and the spacers 13 is formed. That is, the reinforcing part is provided in a region which does not obstruct progress of the light (arrows L11, L12) from the lamp 21 progressing in the normal direction of the one surface 1a of the substrate 1.

At a part out of the optical fiber 7, the part protruding from the holder 15, a bend-suppressing part made of, for example, an adhesive agent is likely to be provided in order to avoid the optical fiber 7 from being disconnected due to bending of the optical fiber 7.

Figure 9A:
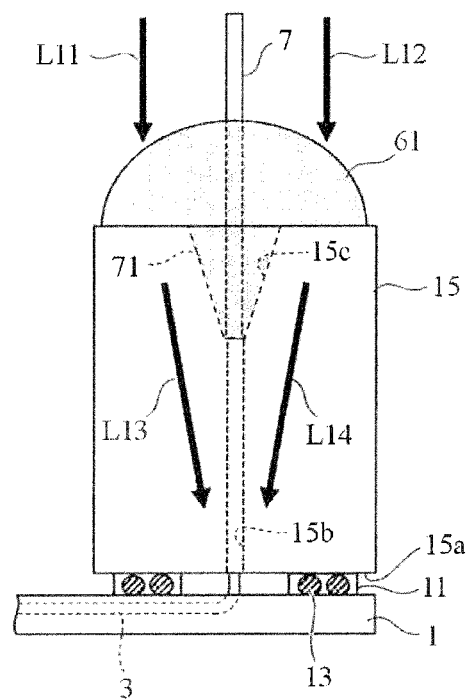
FIG. 9a is a side-view of an optical fiber module according to a second embodiment of the present invention.

However, as shown in FIG. 9a, when a bend-suppressing part 61 is formed in a semi-spherical shape so as to cover almost a whole part of an upper surface of the holder 15, a problem arises in the optical system shown in FIG. 5 in observing the adhesive agent 11 on a lower surface of the holder 15. That is, as shown in FIG. 9a, the light (the arrows L11, L12) from the lamp 21 (refer to FIG. 5) arranged above the holder 15 refracts (bends) at an interface of the semi-spherical bend-suppressing part 61 and is collected at (focused on) a central part of the lower surface of the holder 15. As a result, the adhesive agent 11 including the spacers 13 are not irradiated with the light. Hence, it becomes difficult to observe the adhesive agent 11 including the spacers 13 with the camera 41 (refer to FIG. 5) arranged at a back side of the substrate 1.

Figure 9B:
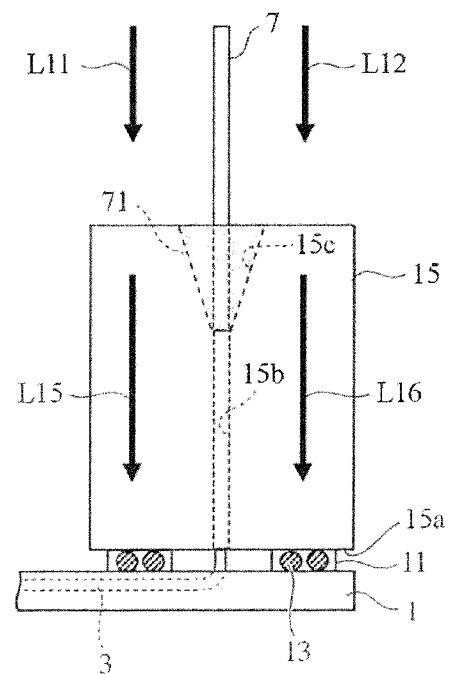
FIG. 9b is a diagram showing another example of the optical fiber module according to the second embodiment of the present invention.
Figure 9C:
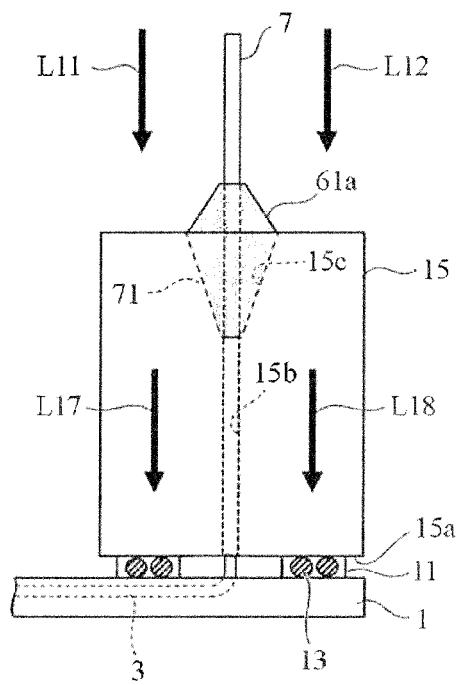
FIG. 9c is a diagram showing another example of the optical fiber module according to the second embodiment of the present invention.
Figure 9D:
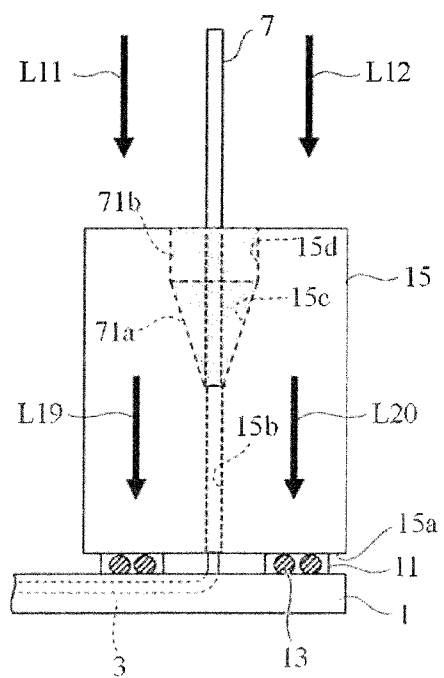
FIG. 9d is a diagram showing an other example of the optical fiber module according to the second embodiment of the present invention.
Figure 10A:
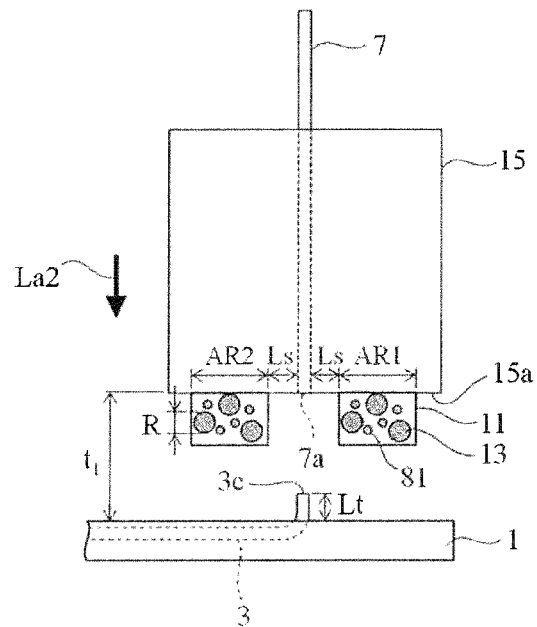
FIG. 10a is a diagram showing a state where dispersing agent is mixed in the adhesive agent, concerning the assembling method shown in FIG. 4a to FIG. 4d.
Figure 10B:
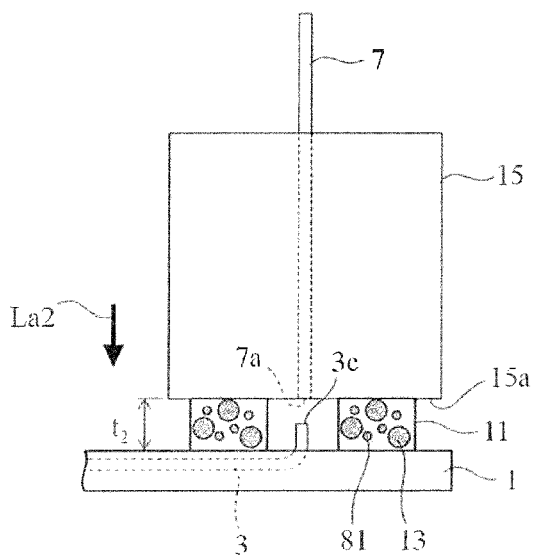
Figure 10C:
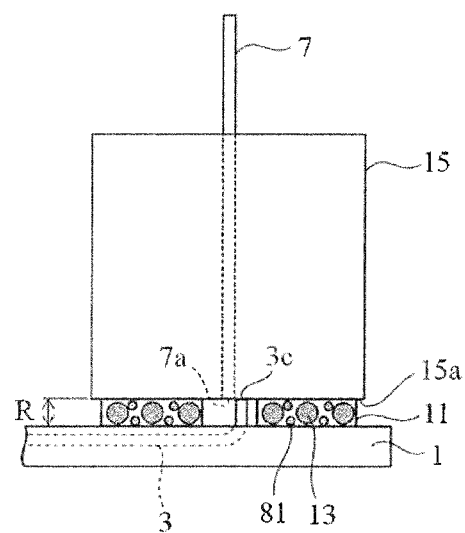
FIG. 10c is a diagram showing a state where all of the spacers come into contact with the holder and the substrate, concerning this connection structure.
Figure 10D:
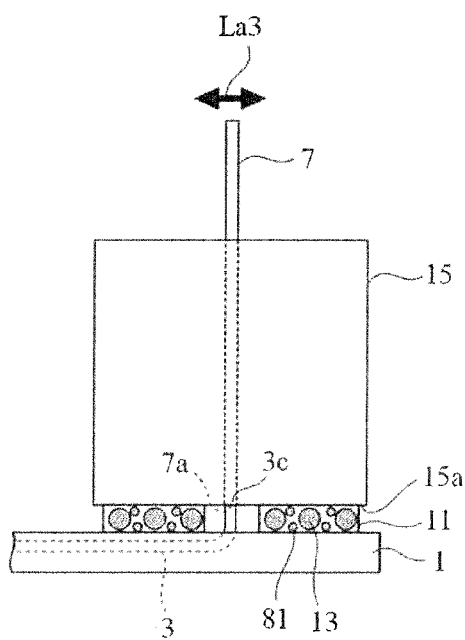
FIG. 10d is a diagram showing a state where the holder is moved along the one surface of the substrate and thereby the alignment is conducted, concerning this connection structure.

Therefore, as shown in FIG. 9b to FIG. 9d, a flat surface out of the upper surface of the holder 15 is made so as to face with positions at which the adhesive agent 11 including the spacers 13 are applied. That is, as shown in FIG. 9b and FIG. 9d, the upper surface of the holder 15 and an upper surface of the reinforcing material 71 are made to be flat surfaces. Alternatively, as shown in FIG. 9c, a bend-suppressing part 61a protruding from the upper surface of the reinforcing material 71 is made to have a small diameter so that the light (the arrows L11, L12) heading to the adhesive agent 11 from the lamp 21 is not bent.

With this, each of light L15 to L18 heading to the adhesive agent 11 through the holder 15 is not directed to the central part of the lower surface of the holder 15 but the adhesive agent 11 is irradiated therewith, and therefore it is not obstructed to observe, with the camera, the adhesive agent 11 including the spacers 13 on the one surface 15a of the holder 15.

In FIG. 9d, a recessed part comprises a tapered recessed part 15c (a height in a vertical direction is same as that of the recessed part 15c in FIG. 9c) and a straight recessed part 15d connected to an upper end of the recessed part 15c. With this, a length of the recessed part become longer compared to FIG. 9b, holding force of the optical fiber 7 by a reinforcing material 71a filled in the recessed part 15c and a reinforcing material 71b filled in the recessed part 15d is reinforced, and a length of a part reinforcing the holding force of the optical fiber 7 becomes longer as well, resulting in improvement of the holding force of the optical fiber 7. Besides, the recessed part 15d positioned at an upper part is straight, and therefore the recessed part 15d does not obstruct progress of light L19, L20 from the lamp 21 (refer to FIG. 5), the adhesive agent 11 being irradiated therewith.

It should be noted that, as shown in FIG. 10a to FIG. 10d, each of which corresponding to FIG. 4a to FIG. 4d, several types of dispersing agent 81 may be mixed, the dispersing agent 81 being made of same material as the spacers 13 in the adhesive agent 11 as well as each having a diameter different from the spacers 13. It is possible to use the spacers 13 for maintaining the distance between the one surface 1a of the substrate 1 and the one surface 15a of the holder 15 and to use the dispersing agent 81 for adjusting viscosity etc. of the adhesive agent 11. Besides, the spacers 13 may have a shape (for example, a cylindrical shape) other than a spherical shape.

Configurations and the like illustrated in the above embodiments are not limited thereto but may adopt various modifications within a scope of the present invention.

For example, the present invention may be applied to an optical fiber module comprising a linear optical waveguide other than the silicon fine-wire optical waveguide.

Besides, in the above embodiments, descriptions are made by taking the substrate for example as an optical circuit formed body. However, the optical circuit formed body may be a body other than the substrate.

Further, in the above embodiments, the optical fiber is accommodated in the hole provided in the holder. However, instead of this, the optical fiber may be accommodated in a groove provided in the holder.

In addition, in the above embodiments, cases where the substrate and the holder are fixed to each other with the adhesive agent are described. However, the present invention may be applied also to a case where the substrate and the holder are fixed to each other with a mean other than the adhesive agent.

Moreover, in the above embodiments, both of the end parts of each of the optical waveguides are protruding from the one surface of the substrate. However, only either one of the end parts may be protruding from the one surface of the substrate.

Other than these, various modifications may be adopted within a scope of the present invention.

INDUSTRIAL APPLICABILITY

The present invention may be applied to an optical fiber module used for optical communication.

REFERENCE SIGNS LIST

A silicon fine-wire optical waveguide structure
B optical module
G gap
1 substrate (optical circuit formed body)
1a one surface of a substrate (first surface)
3 silicon fine-wire optical waveguide (optical waveguide)
3a, 3b end part of each of silicon fine-wire optical waveguides
7 optical fiber
11 adhesive agent
13 spacer
15 holder
15a one surface of a holder (second surface)
15c, 15d recessed part
21 lamp
41 camera
71, 71a, 71b reinforcing material

The invention claimed is:

1. An optical fiber module comprising:
an optical circuit formed body including a first surface, where an optical waveguide is formed and an end part of said optical waveguide is protruding from said first surface;
a holder including a second surface facing with said first surface, which holds an optical fiber and exposes one end part of said optical fiber in such a manner that said one end part of said optical fiber can be optically connected to said end part of said optical waveguide at a side of said second surface; and
a spacer sandwiched between said first surface and said second surface.

2. The optical fiber module according to claim 1, wherein,
a diameter or a height of said spacer along a normal direction of said first surface is substantially same as or larger than a protruding length of said end part of said optical waveguide from said first surface along said normal direction.

3. The optical fiber module according to claim 1, wherein, said spacer is included in an adhesive agent for adhering said first surface of said optical circuit formed body and said second surface of said holder to each other.

4. The optical fiber module according to claim 1, wherein, said optical circuit formed body and said holder are formed so as to transmit light of a specific wavelength.

5. The optical fiber module according to claim 4, wherein, said holder is made of quartz or borosilicate glass.

6. The optical fiber module according to claim 3, wherein, said adhesive agent is provided in such a manner that said adhesive agent is not interposed between said end part of said optical waveguide and said one end part of said optical fiber.

7. The optical fiber module according to claim 1 comprising a reinforcing part for reinforcing holding force of said optical fiber at an opposite side surface of said second surface of said holder, said reinforcing part being provided in a space formed around said optical fiber in said holder.

8. The optical fiber module according to claim 7, wherein, said reinforcing part is made of a reinforcing material fixed to a recessed part formed on said opposite side surface of said holder.

9. The optical fiber module according to claim 7, wherein, said reinforcing part is provided in a region which does not obstruct progress of light of a specific wavelength progressing in a normal direction of said first surface and transmitting through said optical circuit formed body and said holder.

10. The optical fiber module according to claim 1, wherein,
a gap is created between a tip of said end part of said optical waveguide and a tip of said one end part of said optical fiber.

11. The optical fiber module according to claim 1, wherein,
said one end part of said optical fiber is arranged on an optical axis of light emitted from said end part of said optical waveguide.

12. The optical fiber module according to claim 1, wherein,
said optical waveguide is a silicon fine-wire optical waveguide.

13. A method for manufacturing an optical fiber module, said optical fiber module comprising an optical circuit formed body including a first surface, where an optical waveguide is formed and an end part of said optical waveguide is protruding from said first surface, and a holder including a second surface facing with said first surface, which holds an optical fiber and exposes one end part of said optical fiber in such a manner that said one end part of said optical fiber can be optically connected to said end part of said optical waveguide at a side of said second surface, comprising:
preparing a spacer and an adhesive agent for supporting said first surface and said second surface with a predetermined space therebetween;
interposing said adhesive agent including said spacer between said first surface and said second surface;
relatively moving said optical circuit formed body and said holder with respect to each other in such a manner that said first surface and said second surface approach with each other to have said first surface and said second surface sandwich said spacer therebetween; and
curing said adhesive agent and thereby fixing said optical circuit formed body and said holder to each other.

14. The method for manufacturing an optical fiber module according to claim 13 comprising, when relatively moving said optical circuit formed body and said holder with respect to each other in such a manner that said first surface and said second surface approach with each other, irradiating said adhesive agent with light of a specific wavelength transmitting through said holder and said optical circuit formed body, and thereby observing said spacer.

15. The method for manufacturing an optical fiber module according to claim 14 comprising relatively moving said holder along said first surface under a state where said spacer is being held between said first surface and said second surface, and thereby aligning said optical waveguide and said optical fiber.

16. The method for manufacturing an optical fiber module according to claim 13, wherein,
said adhesive agent is a UV curable adhesive agent, and said adhesive agent is cured by irradiating said adhesive agent with UV light.

17. The method for manufacturing an optical fiber module according to claim 13, wherein,
said optical waveguide is a silicon fine-wire optical waveguide.

18. The optical fiber module according to claim 1, wherein said optical waveguide is made of common material from one end thereof through an other end thereof.

19. The optical fiber module according to claim 1, wherein at least a part of an outer peripheral surface of said end part of said optical waveguide is exposed to outside air.

20. The optical fiber module according to claim 1, wherein said spacer has a spherical or a cylindrical shape.

* * * * *